UNITED STATES PATENT OFFICE.

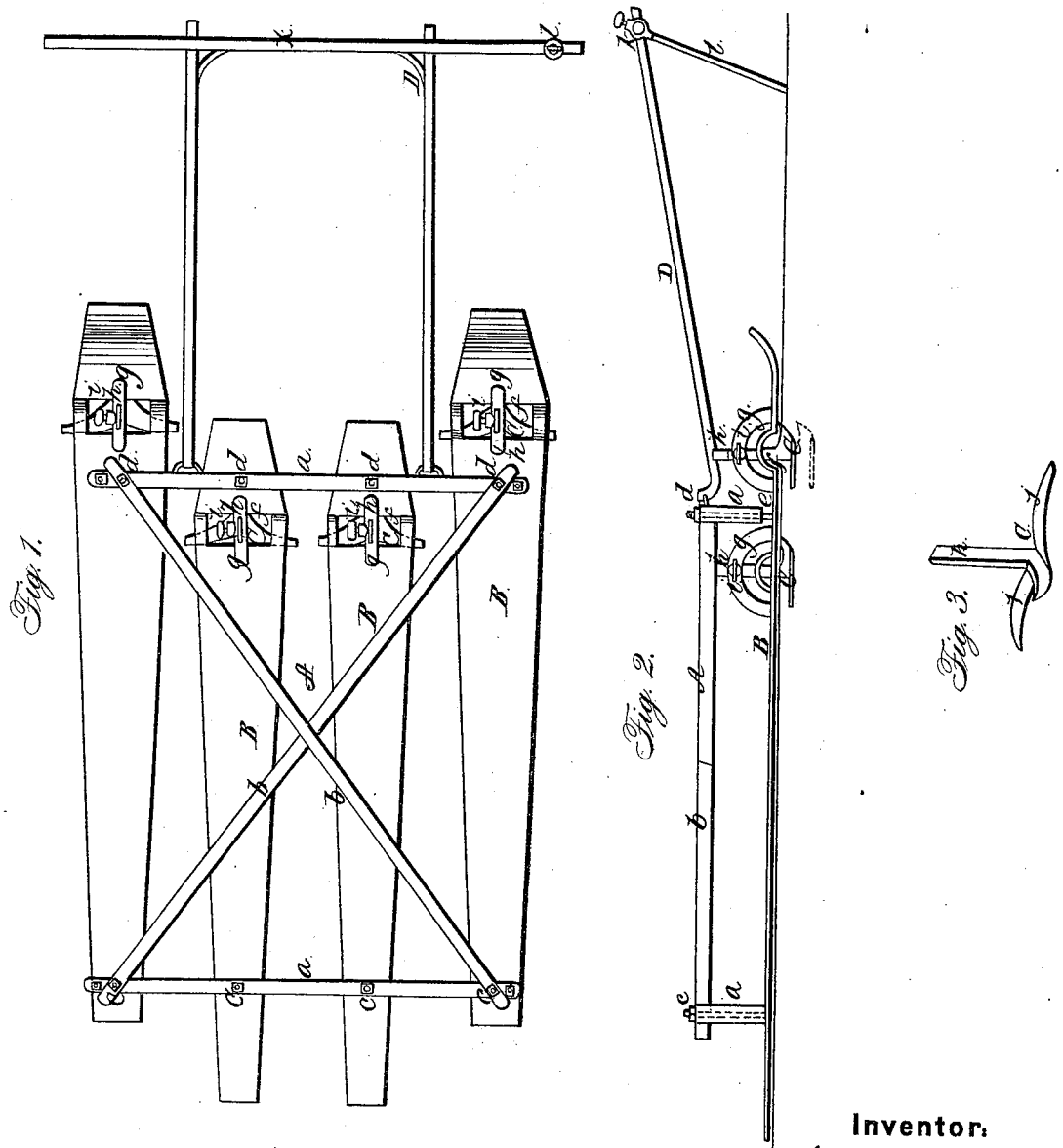

J. HINMAN, OF WATERTOWN, MASSACHUSETTS, AND D. S. FRENCH, OF MARIETTA, GEORGIA, ASSIGNORS TO THEMSELVES AND NATHAN KING, OF MIDDLESEX, MASSACHUSETTS.

IMPROVEMENT IN COTTON-CULTIVATORS.

Specification forming part of Letters Patent No. 29,127, dated July 10, 1860.

*To all whom it may concern:*

Be it known that we, JOSEPH HINMAN, of Watertown, in the county of Middlesex and State of Massachusetts, and D. S. FRENCH, of Marietta, in the county of Cobb and State of Georgia, have invented a new and Improved Machine for Cultivating Cotton; and we do hereby declare that the following is a full, clear, and exact description of the same, reference being had to the annexed drawings, making a part of this specification, in which—

Figure 1 is a plan or top view of our invention. Fig. 2 is a side view of the same. Fig. 3 is a detached perspective view of one of the cutters.

Similar letters of reference indicate corresponding parts in the several figures.

Cotton-seed is planted in drills, the seed being deposited in the earth much closer together than it is designed to have the plants, and the latter, when of a certain size, are thinned out, leaving a requisite space between them. This mode of culture, practiced also in many other kinds of crops, insures a requisite number of plants growing on a given space, saving the trouble and expense of replanting in case of the failure of germination in some of the seed.

The thinning out of the cotton-plants has hitherto been done by hand, and is attended with considerable labor and expense. The object of the within-described invention is to perform such work in a more expeditious manner than can be done by hand, and equally as well and thorough.

The invention consists in the employment or use of a series of runners or plates provided with cutters or shares and attached to a suitable framing a requisite distance apart, and in such a way that a certain degree of vertical adjustment will be allowed them, and the plants thinned out by the cutters by drawing the implement transversely over the drills in which the plants are growing.

To enable those skilled in the art to fully understand and construct our invention, we will proceed to describe it.

A represents the frame of the implement, which is formed simply by having two traverse-pieces, $a\ a'$, connected by diagonal strips $b\ b$.

B represents a series of metal plates. Four are shown in Fig. 1, but more or less may be used. These plates are curved upward at their front ends like sled-runners, and they are attached to the under side of the back traverse-piece, $a$, by bolts $c$. The front parts of the plates B are also attached to the front traverse-piece, $a'$, by bolts $d$, but the latter are longer than the height of the traverse-piece $a'$, and are fitted loosely in it, so that the front parts of the plates B may rise and fall or have a certain degree of vertical play. (See Fig. 2, in which the excess of the length of the bolts $d$ is shown at $e$.) Each plate B, near its front end, is slotted, as shown at $f$, the slots extending nearly the whole width of the plates, as shown clearly in Fig. 1, and to the plates, and directly over the slots, semicircular bars $g$ are attached, said bars having a longitudinal position with the plates. Through each bar $g$ the tang $h$ of the cutter C passes. These tangs $h$ are simply rectangular bars, which may be secured in the bars $g$ at any point by set-screws $i$. The lower ends of the tangs $h$ are bent or curved and brought to a cutting-edge in front, forming the spurs of the cutters, the spurs each having two cutting-wings, $j\ j$, as shown clearly in Fig. 3. The wings $j$ extend a trifle beyond the sides or edges of the plates B, as shown in Fig. 1.

To the front traverse-piece, $a'$, of the implement a pair of thills, D, are attached, and to the front cross-piece, $k$, of the thills there is an index-arm, $l$. (Shown clearly in Fig. 2.)

The implement is used as follows: The operator places himself within the thills D and draws the implement transversely over the drills at right angles thereto, and the cutters C take out the plants with which they come in contact, cutting them off a short distance below the surface of the ground, the depth of cut being regulated by adjusting the tangs $h$ higher or lower in their bars $g$. The plants thus standing will therefore have a space between them equal to the width of the cutters.

In consequence of having a certain degree of vertical play allowed the plates B the latter are allowed to adjust themselves to the irregularities of the surface of the ground.

The index-arm $l$ allows the operator to start right at the commencement of each bout, and also serves as a guide to enable him to thin out the plants evenly.

The slots $f$ in the plates serve as throats to prevent the cutters choking or clogging.

Having thus described our invention, what we claim as new, and desire to secure by Letters Patent, is—

1. The employment or use of a series of plates, B, provided with cutters C, and attached to a frame, A, substantially as shown, for the purpose set forth.

2. Attaching the cutters C to the plates B by means of tangs $h$, secured by set-screws in semi-circular bars $g$ on the plates, directly over slots $f$ therein, as and for the purpose specified.

JOSEPH HINMAN.
D. S. FRENCH.

Witnesses:
HENRY W. WALKER,
A. W. CHAMBERLIN.